US011662271B1

(12) United States Patent
Dong et al.

(10) Patent No.: US 11,662,271 B1
(45) Date of Patent: May 30, 2023

(54) ROAD SIMULATION DEVICE AND TEST METHOD

(71) Applicant: Beijing Institute of Technology, Beijing (CN)

(72) Inventors: Mingming Dong, Beijing (CN); Yitong Wang, Beijing (CN); Yue Bian, Beijing (CN); Shen Lu, Beijing (CN); Xiang Ji, Beijing (CN)

(73) Assignee: Beijing Institute of Technology, Beijing (CN)

( * ) Notice: Subject to any disclaimer, the term of this patent is extended or adjusted under 35 U.S.C. 154(b) by 0 days.

(21) Appl. No.: 17/971,051

(22) Filed: Oct. 21, 2022

(30) Foreign Application Priority Data

Dec. 2, 2021 (CN) .......................... 202111459907.0

(51) Int. Cl.
*G01M 17/007* (2006.01)
(52) U.S. Cl.
CPC ................................ *G01M 17/007* (2013.01)
(58) Field of Classification Search
CPC .. G01M 17/007; G01M 7/022; G01M 13/027; G01M 7/02; G01M 7/06; G01M 17/04
USPC ...................................................... 73/118.01
See application file for complete search history.

(56) References Cited

U.S. PATENT DOCUMENTS

2013/0104670 A1* 5/2013 Saari ..................... G01M 7/022
73/862.381

FOREIGN PATENT DOCUMENTS

CN 112525449 A * 3/2021 ............ G01M 7/022

OTHER PUBLICATIONS

Chinese First Office Action for application No. 202111459907.0 dated Jun. 17, 2022 with English translation.
Notification to Grant Patent Right for Invention for application No. 02111459907.0 dated Sep. 8, 2022 with English Translation.
Allowed Chinese Claims for Chinese Application No. 202111459907.0.

* cited by examiner

*Primary Examiner* — Eric S. McCall
*Assistant Examiner* — Timothy P Graves
(74) *Attorney, Agent, or Firm* — Jason B. Scher; Carter, DeLuca & Farrell LLP

(57) ABSTRACT

The road simulation device includes a frame structure and a transmission structure. The transmission structure includes a first test bench, a second test bench, a third test bench and a fourth test bench. A first sliding plate structure of the first test bench slides in a first direction and a second direction, a second sliding plate structure of the second test bench slides in the first direction, and a third sliding plate structure of the third test bench slides in the second direction. The first sliding plate structure and the first base structure, the second sliding plate structure and the second base structure, the third sliding plate structure and the third base structure, as well as the fourth baffle plate structure and the fourth base structure are connected by spherical hinges. Damages to the frame structure caused by huge acting force generated by rigid connection during testing can be avoided.

16 Claims, 5 Drawing Sheets

ROAD SIMULATION DEVICE AND TEST METHOD

CROSS REFERENCE TO RELATED APPLICATION

This patent application claims the benefit of and priority to Chinese Patent Application No. 202111459907.0 filed on Dec 2, 2021, the disclosure of which is incorporated by reference herein in its entirety as part of the present application.

TECHNICAL FIELD

The present disclosure relates to the technical field of vehicle testing, and particularly relates to a road simulation device and a test method.

BACKGROUND ART

At present, the main international suppliers of road simulation test benches for vehicles on the market are Instron corporation, MTS Corporation, Moog and Japan Saginomiya. The most used by companies or research centers in China are test benches from MTS, including the Tianjin Automotive Research Institute, Shanghai Automotive Industry Technical Center, Pan Asia Technical Automotive Center Co., China North Vehicle Research Institute, etc.

Among them, the MTS 320 4-channel tire-coupled road simulator-"4-post" has become a widely used test device in the above centers. The four-post test bench can achieve indoor vehicle road simulation by cooperating with control software. That is, by inputting specific road excitation, the test under the indoor condition achieves the same effect as the actual working condition according to the own working condition of the vehicle, thereby greatly saving the time cost and reducing the test difficulty.

Although the current road simulation test equipment has been developed relatively well, there are limitations, that is, the specific test sample can only be the mature vehicle structure. The bench can be directly used for testing performances such as smoothness of the whole automobile. If the vibration comfort of the self-designed automobile frame and seat needs to be tested, the self-designed automobile frame and seat are connected to the four posters only by the rigid bench, and when performing simulation road surface excitation, an independent test bench can only make vertical motion, which will inevitably cause theoretical relative displacement of a theoretical connection point on a horizontal plane in the movement of the bench; however, due to the rigid connection, the relative displacement cannot be achieved, the caused shear force caused will cause damage to the test bench, leading to great loss.

SUMMARY

An objective of the present disclosure is to provide a road simulation device and a test method to solve the problems in the prior art, which can avoid damages to the frame structure caused by huge acting force generated by rigid connection during testing, and realize tests on riding comfort, comfort and the like of automobiles on different road models, thereby improving the efficiency of the testing.

To achieve the objective, the present disclosure provides the following solutions.

It is provided a road simulation device, including a frame structure and a transmission structure, where the transmission structure includes a first test bench, a second test bench, a third test bench, and a fourth test bench.

The first test bench includes a first baffle structure and a first base structure, the second test bench includes a second baffle structure and a second base structure, the third test bench includes a third baffle structure and a third base structure, and the fourth test bench includes a fourth baffle structure and a fourth base structure.

A first sliding plate structure is arranged in the first baffle structure, and slides in the first baffle structure in a first direction and a second direction; a second sliding plate structure is arranged in the second baffle structure, and slides in the second baffle structure in the first direction; a third sliding plate structure is arranged in the third baffle structure, and slides in the third baffle structure in the second direction.

The first sliding plate structure and the first base structure are connected by a first spherical hinge, the second sliding plate structure and the second base structure are connected by a second spherical hinge, the third sliding plate structure and the third base structure are connected by a third spherical hinge, and the fourth baffle structure and the fourth base structure are connected by a fourth spherical hinge.

Upper ends of the first baffle structure, the second baffle structure, the third baffle structure and the fourth baffle structure are all connected to the frame structure, and lower ends of the first base structure, the second base structure, the third base structure and the fourth base structure are configured to be connected to road simulation vibration excitation equipment.

In some embodiments, the first baffle structure includes a first bottom plate and four first side plates; the four fist side plates are connected in sequence, upper ends of the four first side plates are connected to the frame structure, the first bottom plate is located under the four first side plates. The first bottom plate is provided with a first through hole, and a size of the first through hole is less than that of the first sliding plate and greater than that of the first spherical hinge. A plurality of first elastic elements are respectively arranged between the first sliding plate structure and the four first side plates.

In some embodiments, the second baffle structure includes a second bottom plate and four second side plates; the four second side plates are connected in sequence. Upper ends of the four second side plates are connected to the frame structure. The second bottom plate is located under the four second side plates, the second bottom plate is provided with a second through hole, and a size of the second through hole is less than that of the second sliding plate and greater than that of the second spherical hinge. The second sliding plate structure is provided with first via holes through which first LM shafts penetrate, and two ends of the first LM shafts are respectively connected to two corresponding ones of the four second side plates.

In some embodiments, the third baffle structure includes a third bottom plate and four third side plates; the four third side plates are connected in sequence, upper ends of the four third side plates are connected to the frame structure. The third bottom plate is located under the four third side plates, the third bottom plate is provided with a third through hole, and a size of the third through hole is less than that of the third sliding plate and greater than a size of the third spherical hinge; the third sliding plate structure is provided with second via holes through which second LM shafts penetrate, and two ends of the second LM shafts are respectively connected to two corresponding ones of the fourth third side plates.

In some embodiments, the first LM shafts are perpendicular to the second LM shafts; the first LM shafts each are sleeved with two second elastic elements, and each second elastic element is located between one corresponding second side plate and a sidewall of the second sliding plate structure. The second LM shafts each are sleeved with two third elastic elements, and each third elastic element is located between one corresponding third side plate and a sidewall of the third sliding plate structure.

In some embodiments, the frame structure includes a bottom plate and a fence; a lower end of the bottom plate is connected to the upper ends of the first baffle structure, the second baffle structure, the third baffle structure and the fourth baffle structure, and the fence is arranged at an upper end of the bottom plate.

In some embodiments, the frame structure is provided with a seat structure, the seat structure is provided with a safety belt and for a tester to sit on, and sensors are arranged on the tester.

In some embodiments, the first base structure, the second base structure, the third base structure and the fourth base structure have a same structure; the first base structure, the second base structure, the third base structure and the fourth base structure each includes a support post and a base. An upper end of the support post is connected to one corresponding spherical hinge, a lower end of the support post is connected to the base, and a lower end of the base is connected to the road simulation vibration excitation equipment.

It is also provided a test method using the road simulation device, including following steps:
 step one: enabling a tester sitting on the frame structure, and arranging sensors on a body of the tester;
 step two: importing a road spectrum file into an upper computer, driving, by the upper computer, each road simulation vibration excitation equipment, and transferring road excitation to the road simulation device;
 step three: acquiring signals of the sensors; and
 step four: performing data processing and evaluation on the signals acquired by the sensors.

Compared with the prior art, the present disclosure has the following technical effects.

In accordance with the present disclosure, by means of the rotation of the spherical hinges relative to the first base structure, the second base structure, the third base structure and the fourth base structure, and the sliding of the first sliding plate structure relative to the first base structure, the sliding of the second sliding plate structure relative to the second base structure, and the sliding of the third sliding plate structure relative to the third base structure, the relative displacement of connection points on a horizontal plane generated during random road simulation is compensated, and the change of pitching and rolling angles can be performed to achieve the same motion form effect as an actual vehicle chassis, and damages to the frame structure caused by huge acting force generated by rigid connection during testing can be avoided. In accordance with the present disclosure, the tests on riding comfort, comfort and the like of automobiles on different road models may be achieved, thereby improving the efficiency of the testing.

BRIEF DESCRIPTION OF THE DRAWINGS

To describe the technical solutions in the embodiments of the present disclosure or in the prior art more clearly, the following briefly describes the accompanying drawings for the embodiments. Apparently, the accompanying drawings in the following description show merely some embodiments of the present disclosure, and a person of ordinary skill in the art may still derive other drawings from these accompanying drawings without creative efforts.

Figure 1:
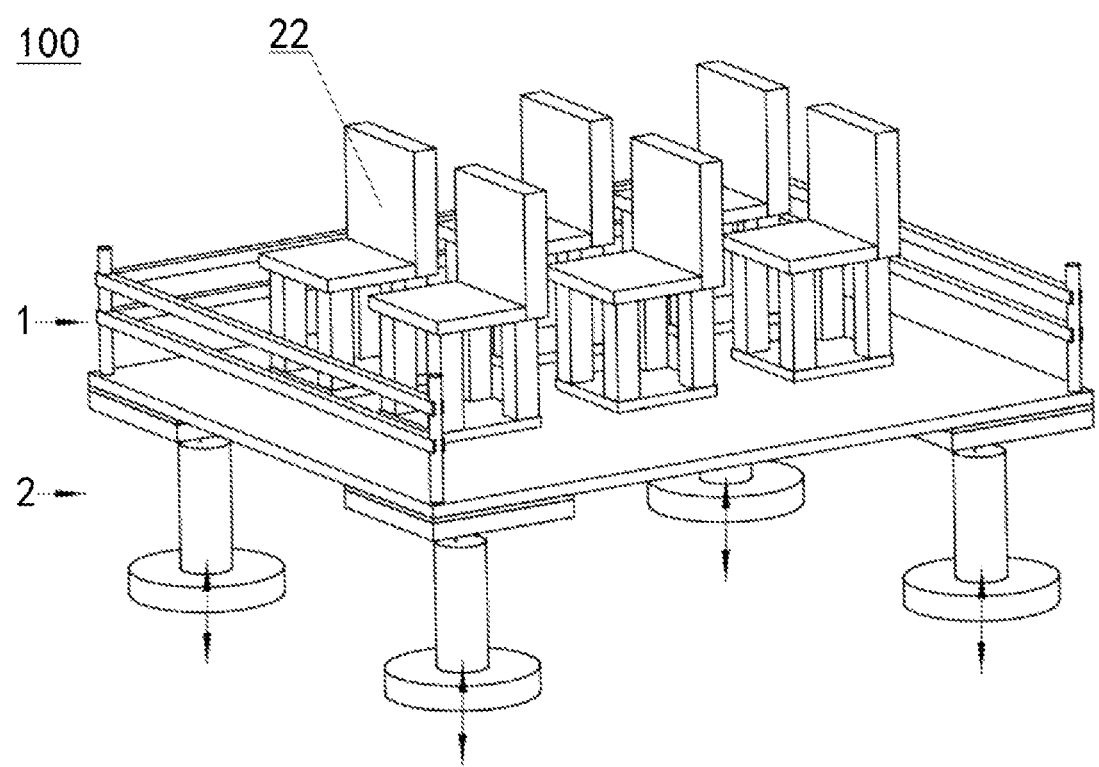
FIG. 1 is a schematic diagram of a road simulation device in accordance with the present disclosure.

Reference numerals: 100-road simulation device; 1-frame structure; 2-transmission structure; 3-first test bench; 4-second test bench; 5-third test bench; 6-fourth test bench; 7-first sliding plate structure; 8-second sliding plate structure; 9-third sliding plate structure; 10-spherical hinge; 11-first bottom plate; 12-first side plate; 13-first elastic element; 14-second bottom plate; 15-second side plate; 16-first LM shaft; 17-third bottom plate; 18-third side plate; 19-second LM shaft; 20-bottom plate; 21-fence; 22-seat structure; 23-support post; 24-base.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a road simulation device and a test method to solve the problems in the prior art. In the present disclosure, damages to the frame structure caused by huge acting force generated by rigid connection during testing can be avoided; tests on riding comfort, comfort and the like of automobiles on different road models may be realized, and the efficiency of the testing is improved.

To make the objectives, features and advantages of the present disclosure more apparent and understandable, the following further describes the present disclosure in detail with reference to the accompanying drawings and specific embodiments.

Embodiment I

Figure 2:
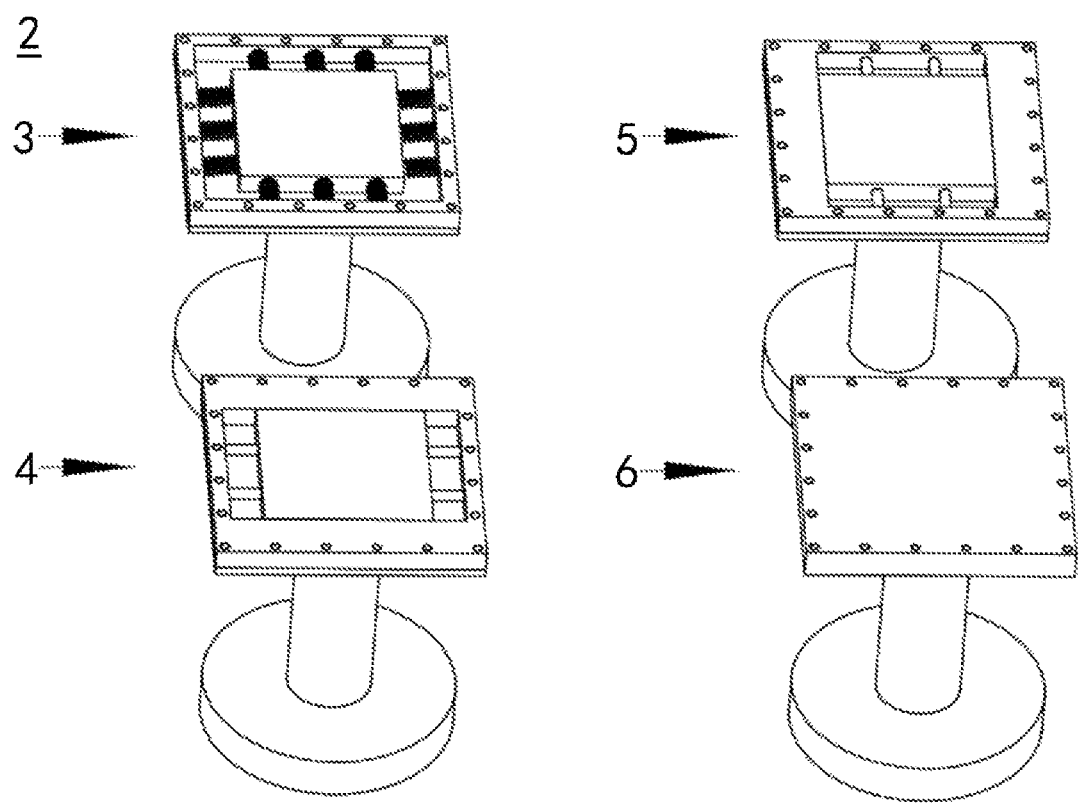
FIG. 2 is a schematic diagram of a transmission structure in accordance with the present disclosure.
Figure 3:
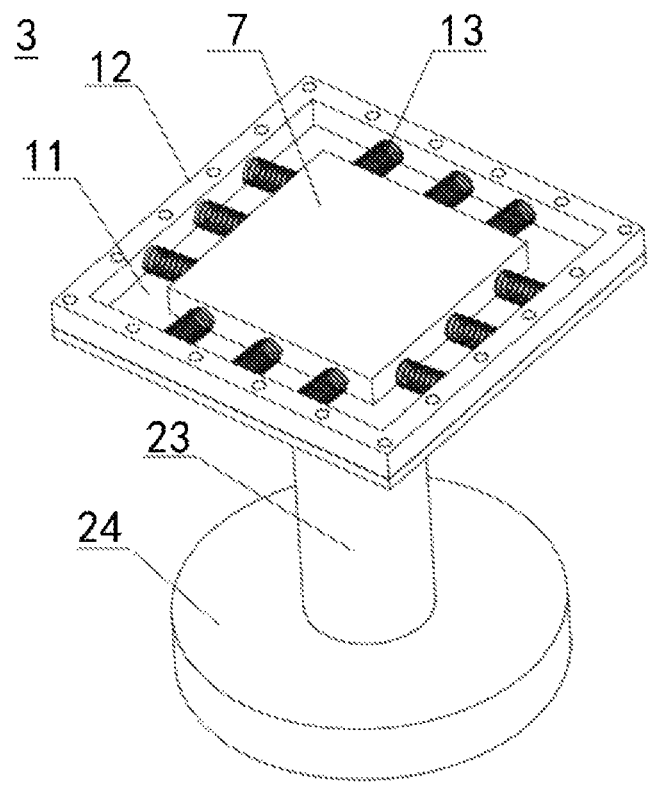
FIG. 3 is a schematic diagram of a first test bench in accordance with the present disclosure.
Figure 4:
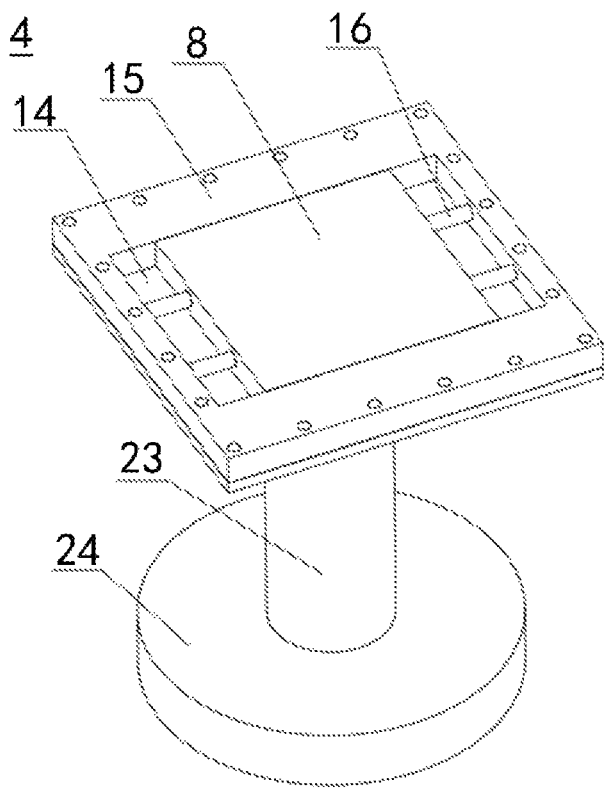
FIG. 4 is a schematic diagram of a second test bench in accordance with the present disclosure.
Figure 5:
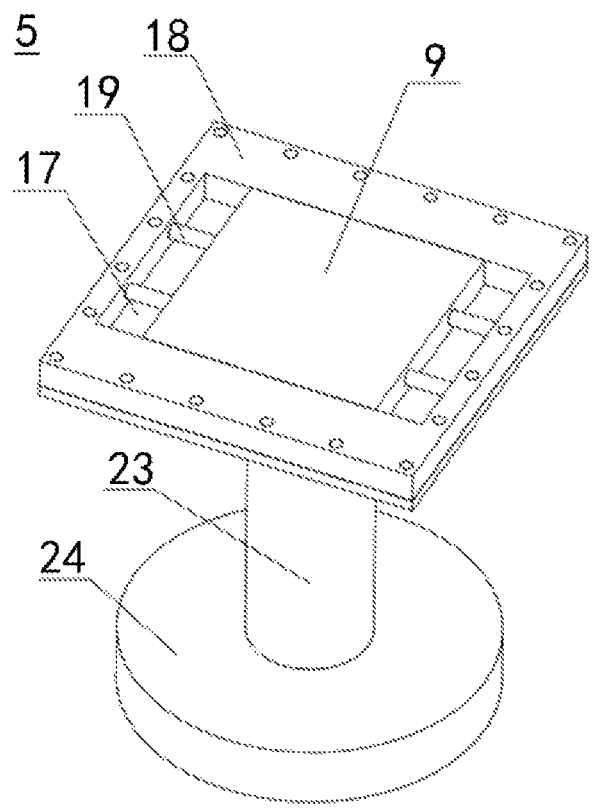
FIG. 5 is a schematic diagram of a third test bench in accordance with the present disclosure.
Figure 6:
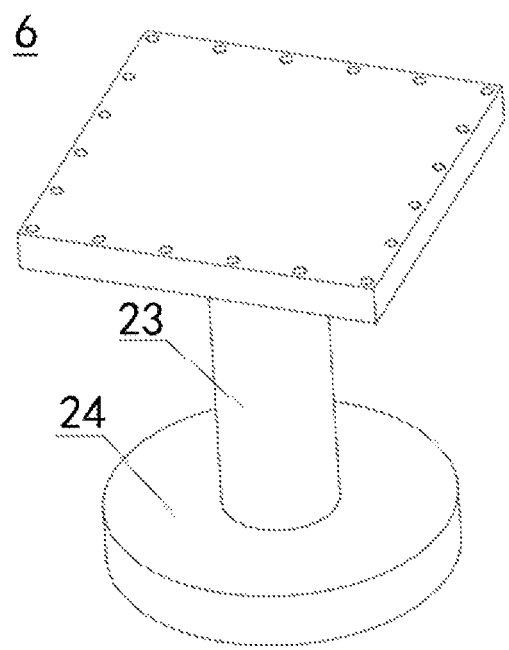
FIG. 6 is a schematic diagram (from first angle of view) of a fourth test bench in accordance with the present disclosure.
Figure 7:
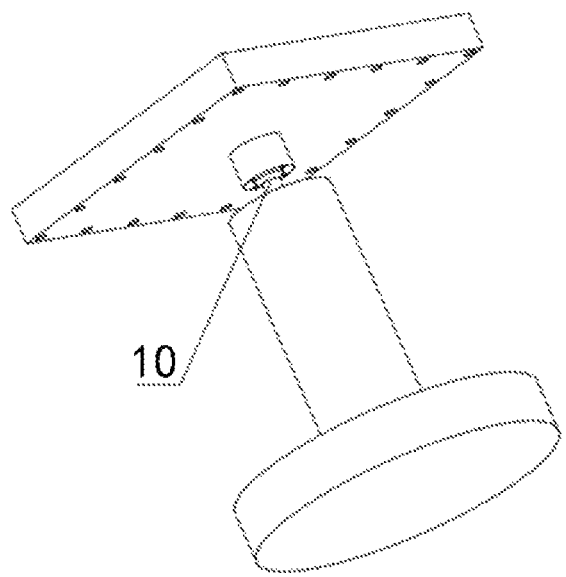
FIG. 7 is a schematic diagram (from second angle of view) of a fourth test bench in accordance with the present disclosure.
Figure 8:
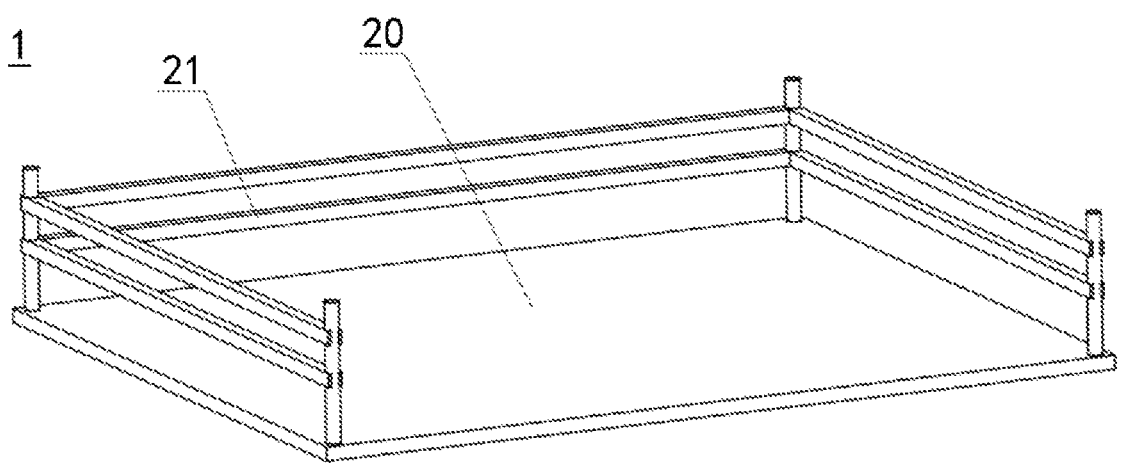
FIG. 8 is a schematic diagram of a frame structure in accordance with the present disclosure.

As shown in FIG. 1 to FIG. 8, a road simulation device 100 is provided. The road simulation device includes a frame structure 1 and a transmission structure 2. The frame structure 1 refers to an automobile frame, a chassis and other structures. The transmission structure 2 includes a first test bench 3, a second test bench 4, a third test bench 5, and a fourth test bench 6.

The first test bench 3 includes a first baffle structure and a first base structure. The second test bench 4 includes a second baffle structure and a second base structure. The third test bench 5 includes a third baffle structure and a third base structure. The fourth test bench 6 includes a fourth baffle structure and a fourth base structure.

A first sliding plate structure 7 is arranged in the first baffle structure, the first sliding plate structure 7 may slide in the first baffle plate structure, and can slide in a first direction and a second direction. A second sliding plate structure 8 is arranged in the second baffle structure, and may slide in the second baffle structure and in the first direction. A third sliding plate 9 is arranged in the third baffle structure, the third sliding plate 9 may slide in the third baffle structure and in the second direction.

The first sliding plate structure 7 and the first base structure are connected by a one spherical hinge 10, the second sliding plate structure 8 and the second base structure are connected by one spherical hinge 10, the third sliding plate structure 9 and the third base structure are connected by one spherical hinge 10, and the fourth baffle structure and the fourth base structure are connected by one spherical hinge. Through the spherical hinge 10, the frame structure 1 is rotated with respect to the first base structure, the second base structure, the third base structure, and the fourth base structure at a certain angle.

Upper ends of the first baffle structure, the second baffle structure, the third baffle structure and the fourth baffle structure are all connected to the frame structure 1. Lower ends of the first base structure, the second base structure, the third base structure and the fourth base structure are configured to be connected to the road simulation vibration excitation equipment, and the road simulation vibration excitation equipment may be selected as a hydraulic structure.

In accordance with the embodiment, by means of the rotation of the spherical hinge 10 relative to the first base structure, the second base structure, the third base structure and the fourth base structure, and the sliding of the first sliding plate structure 7 relative to the first base structure, the sliding of the second sliding plate structure 8 relative to the second base structure, and the sliding of the third sliding plate structure 9 relative to the third base structure, the relative displacement of connection points on a horizontal plane generated during random road simulation is compensated, the change of pitching and rolling angles can be performed to achieve the same motion form effect as an actual vehicle chassis, thereby avoiding damages to the frame structure 1 caused by huge acting force generated by rigid connection during testing.

In accordance with the embodiment, the first direction is an X direction, and the second direction is a Y direction.

In accordance with the embodiment, the first test bench 3, the second test bench 4, the third test bench 5 and the fourth test bench 6 have different structures, such that when the first test bench 3, the second test bench 4, the third test bench 5 and the fourth test bench 6 are located at different heights, the frame structure 1 on the test benches may be located at different rolling and pitching angles, and redundant back-and-forth shaking may not happen to the frame structure 1 due to limitation of the degree of freedom during high-frequency change. The road excitation which is designed in advance may be directly transmitted to the frame structure 1 so as to achieve the same effect as that of a real vehicle test.

In accordance with the embodiment, the fourth baffle structure of the fourth test bench 6 is provided with a plurality of threaded holes, four third side plates 18 are fixedly connected to the frame structure 1 by bolts to achieve coupling; and the lower end of the fourth baffle structure is connected to the spherical hinge 10 by bolts. As the fourth test bench 6 does not have a sliding plate mechanism, is respectively and fixedly connected to the spherical hinge 10 and the frame structure 1 through the fourth baffle structure, the fourth test bench 6 may not slide relative to the frame structure 1, thus limiting a motion state of the frame structure 1 when the road simulation device 100 is operated. That is, when the frame structure 1 is tilted, there is no excessive vibration and shaking caused by high-speed change of the center of mass due to high-frequency angle change.

In accordance with the embodiment, the first baffle structure includes a first bottom plate 11 and four first side plates 12. The four first side plates 12 are connected in sequence, provided with a plurality of threaded holes, and fixedly connected to the frame structure 1 by the bolts to achieve coupling. The first bottom plate 11 is located under the four first side plates 12, the first bottom plate 11 is provided with a first through hole, and a size of the first through hole is less than that of the first sliding plate structure 7 and greater than that of the spherical hinge 10. A plurality of first elastic elements 13 are respectively arranged between a periphery of the first sliding plate structure 7 and the first side plates 12. The size of the first sliding plate structure 7 is less than that of the first bottom plate 11, and the first sliding plate structure 7 may achieve bidirectional sliding in the first direction and the second direction. The first elastic element 13 is a spring, and the first elastic element 13 functions to prevent the first sliding plate structure 7 from colliding with the first side plate 12 when angle change and displacement change occur, thus protecting the first test bench 3.

In accordance with the embodiment, the second baffle structure includes a second bottom plate 14 and four second side plates 15. The four second side plates 15 are connected in sequence, provided with a plurality of threaded holes, and fixedly connected to the frame structure 1 by the bolts to achieve the coupling. The second bottom plate 14 is located under the four second side plates 15, the second bottom plate 14 is provided with a second through hole, and a size of the second through hole is less than that of the second sliding plate structure 8 and greater than that of the spherical hinge 10. The second sliding plate 8 is provided with first via holes, into which first LM shafts 16 penetrate, and sizes of the first via holes are greater than that of the first LM shafts 16. Two ends of the first LM shaft 16 are respectively connected to two of the four second side plates 15, the second sliding plate 8 may slide in the first direction along the first LM shaft 16. Two oppositely arranged second side plates 15 may limit the motion of the second sliding plate structure 8 in the second direction, thus improving the stability of the second sliding plate structure 8 during relative sliding. The first LM shafts 16 each are sleeved with two second elastic elements, each second elastic element is located between the second side plate 15 and the sidewall of the second sliding plate structure 8, one end of the second elastic element abuts against the second side plate 15, the other end of the second elastic element abuts against the sidewall of the second sliding plate structure 8, and the two second elastic elements on the same first LM shaft 16 are symmetrically arranged.

In accordance with the embodiment, the third baffle structure includes a third bottom plate 17 and four third side plates 18. The four third side plates 18 are connected in sequence, provided with a plurality of threaded holes, and fixedly connected to the frame structure 1 by the bolts to achieve coupling. The third bottom plate 17 is located under the four third side plates 18, and provided with a third through hole, and the size of the third through hole is less than that of the third sliding plate structure 9 and greater than that of the spherical hinge 10. The third sliding plate structure 9 is provided with second via holes, into which second LM shafts 19 penetrate, and the sizes of the second via holes are greater than that of the second LM shafts 19. Two ends of the second LM shaft 19 are respectively connected to two of the four third side plates 18, and the first LM shafts 16 are perpendicular to the second LM shafts 19. The third sliding plate 9 may slide in the second direction along the second LM shaft 19. Two oppositely arranged third side plates 18 may limit the motion of the third sliding plate structure 9 in the first direction, thus improving the stability of the third sliding plate structure 9 during relative sliding. The second LM shafts 19 each are sleeved with two third elastic elements, each third elastic element is located between the third side plate 18 and the sidewall of the third sliding plate structure 9, one end of the third elastic element abuts against the third side plate 18, the other end of the third elastic element abuts against the sidewall of the third sliding plate structure 9, and the two third elastic elements on the same second LM shaft 19 are symmetrically arranged. The second elastic element and the third elastic element are both springs. The second elastic element and the third elastic element may function to buffer, and may enable the corresponding second sliding plate structure 8 and the corresponding third sliding plate structure 9 to return to the original position when the second test bench 4 and the third test bench 5 are static.

In accordance with the embodiment, the first side plate 12, the second side plate 15 and the third side plate 18 are respectively used to limit the displacement of the frame structure relative to the first test bench 3, the second test bench 4, and the third test bench 5. The first through hole, the second through hole and the third through hole serve to allow the spherical hinges 10 to pass through, thereby guaranteeing that when relative sliding occurs, the spherical hinges 10 cannot collide with the first bottom plate 11, the second bottom plate 14 and the third bottom plate 17, and serve to protect the operation of the device by not allowing the first sliding plate structure 7, the second sliding plate structure 8 and the third sliding plate structure 9 to drop out from the through holes in the moving process.

In accordance with the embodiment, the frame structure 1 includes a bottom plate 20 and a fence 21. Lower end of the bottom plate 20 is connected to the upper ends of the first baffle structure, the second baffle structure, the third baffle structure and the fourth baffle structure. The fence 21 surrounds the upper end of the bottom plate 20, one side of the upper end of the bottom plate 20 is not provided with the fence 21 and serves as an inlet end, and the fence 21 is used to guarantee the safety of a test.

In accordance with the embodiment, the frame structure 1 is provided with a seat structure 22. The seat structure 22 is provided with a safety belt, and used for a tester to sit on, and sensors are arranged on a body of the tester. The sensors include a physiological characteristic sensor series which is used for detecting signals such as electroencephalogram, electrocardio, myoelectricity and blood oxygen of a human body, and further include NVH series sensors, namely, an acceleration sensor, a displacement sensor and a noise sensor which are used for detecting acceleration, displacement and noise signals.

In accordance with the embodiment, the first base structure, the second base structure, the third base structure and the fourth base structure have the same structure, the first base structure, the second base structure, the third base structure and the fourth base structure each include a support post 23 and a base 24. The upper end of the supporting post 23 is connected to the spherical hinge 10, and the lower end of the support post 23 is connected to the base 24. The four bases 24 are respectively connected to a vibration excitation head of the road simulation vibration excitation equipment by the bolts.

In accordance with the embodiment, the first base structure, the second base structure, the third base structure and the fourth base structure are respectively connected to four road simulation vibration excitation equipment, which may be equivalent to four tires of an automobile to transfer displacement and force. The first test bench 3, the second test bench 4, the third test bench 5 and the fourth test bench 6 correspond to tire systems at the front left, the rear left, the front right and the rear right of the automobile respectively. The first test bench 3, the second test bench 4, the third test bench 5 and the fourth test bench 6 are respectively displaced through the road simulation vibration excitation equipment, that is, the contact surfaces between the four test benches and the frame structure 1 may be at different heights at the same moment, and the frame structure 1 may generate angle changes such as pitching and rolling to achieve the function of simulating road input. At the moment, the motion of the frame structure 1 may be equivalent to a real vehicle test environment, the sensors may be directly arranged for detection, or a human body test may be performed according to test design, that is, a tester sits on the seat structure 22 for testing after the sensors are arranged on the body of the tester. According to the embodiment, the same effect as an outdoor test which consumes a large amount of manpower and material resources may be achieved only by performing relatively simple design indoors.

Embodiment II

The embodiment provides a test method using a road simulation device 100 of embodiment I, which includes the following steps.

Step one: a tester sits on the frame structure 1, and sensors are arranged on the body of the tester;

Step two, a road spectrum file is imported into an upper computer, the upper computer is used to drive various road simulation vibration excitation equipment and to transfer the road excitation to the road simulation device 100.

Specifically, the road spectrum is generated by using related software, road spectra such as sweep frequency, sine and random roads are generated by programming, the road spectrum data are manufactured into an independent file, and then the road spectrum file is imported into software of the upper computer; the change of road height data with time is converted into change of electric signals with time by means of digital-to-analog conversion, and then each of the road simulation vibration excitation equipment is driven to perform respective actions according to programming signals, that is, the vertical displacement change is achieved so as to complete the road excitation input of road simulation preliminarily.

Step three: signals of the sensors, namely physical sign parameters, are acquired.

Step four: the signals acquired by the sensors are subjected to data processing and evaluation.

In accordance with the embodiment, generating and programming the road spectrum is the prior art.

In accordance with the embodiment, self-designed local tests, such as the vibration comfort level of the frame structure 1 and the seat structure 22, may be efficiently completed. In accordance with the embodiment, different random road simulations and excitation inputs such as sine, step and sweep frequency may be self-designed and realized according to test demands, and the first test bench 3, the second test bench 4, the third test bench 5 and the fourth test bench 6 have different degrees of freedom in the simulation process due to their unique structural designs. Through the road simulation device 100, the rotation and displacement of the frame structure relative to the first base structure, the second base structure and the third base structure and the rotation of the frame structure 1 relative to the fourth base structure may be achieved while transmission of the displacement and force is realized, thereby protecting the first test bench 3, the second test bench 4, the third test bench 5, the fourth test bench 6, and the frame structure 1. Moreover, according to test demands, different testers and different sensor arrangement modes may be selected to perform data acquisition and subsequent processing, the tests such as riding comfort, comfort and the like of the automobile on different road models are completed, and the efficiency of the testing is greatly improved.

Several examples are used for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A road simulation device, comprising a frame structure and a transmission structure, wherein the transmission structure comprises a first test bench, a second test bench, a third test bench, and a fourth test bench;
   the first test bench comprises a first baffle structure and a first base structure, the second test bench comprises a second baffle structure and a second base structure, the third test bench comprises a third baffle structure and a third base structure, and the fourth test bench comprises a fourth baffle structure and a fourth base structure;
   a first sliding plate structure is arranged in the first baffle structure, and slides in the first baffle structure in a first direction and a second direction; a second sliding plate structure is arranged in the second baffle structure, and slides in the second baffle structure in the first direction; a third sliding plate structure is arranged in the third baffle structure, and slides in the third baffle structure in the second direction;
   the first sliding plate structure and the first base structure are connected by a first spherical hinge, the second sliding plate structure and the second base structure are connected by a second spherical hinge, the third sliding plate structure and the third base structure are connected by a third spherical hinge, and the fourth baffle structure and the fourth base structure are connected by a fourth spherical hinge;
   upper ends of the first baffle structure, the second baffle structure, the third baffle structure and the fourth baffle structure are all connected to the frame structure, and lower ends of the first base structure, the second base structure, the third base structure and the fourth base structure are configured to be connected to road simulation vibration excitation equipment.

2. The road simulation device according to claim 1, wherein the first baffle structure comprises a first bottom plate and four first side plates; the four fist side plates are connected in sequence, upper ends of the four first side plates are connected to the frame structure, the first bottom plate is located under the four first side plates, the first bottom plate is provided with a first through hole, and a size of the first through hole is less than that of the first sliding plate and greater than that of the first spherical hinge; a plurality of first elastic elements are respectively arranged between the first sliding plate structure and the four first side plates.

3. The road simulation device according to claim 1, wherein the second baffle structure comprises a second bottom plate and four second side plates; the four second side plates are connected in sequence, upper ends of the four second side plates are connected to the frame structure, the second bottom plate is located under the four second side plates, the second bottom plate is provided with a second through hole, and a size of the second through hole is less than that of the second sliding plate and greater than that of the second spherical hinge; the second sliding plate structure is provided with first via holes through which first LM shafts penetrate, and two ends of the first LM shafts are respectively connected to two corresponding ones of the four second side plates.

4. The road simulation device according to claim 3, wherein the third baffle structure comprises a third bottom plate and four third side plates; the four third side plates are connected in sequence, upper ends of the four third side plates are connected to the frame structure, the third bottom plate is located under the four third side plates, the third bottom plate is provided with a third through hole, and a size of the third through hole is less than that of the third sliding plate and greater than a size of the third spherical hinge; the third sliding plate structure is provided with second via holes through which second LM shafts penetrate, and two ends of the second LM shafts are respectively connected to two corresponding ones of the fourth third side plates.

5. The road simulation device according to claim 4, wherein the first LM shafts are perpendicular to the second LM shafts; the first LM shafts each are sleeved with two second elastic elements, and each second elastic element is located between one corresponding second side plate and a sidewall of the second sliding plate structure; the second LM shafts each are sleeved with two third elastic elements, and each third elastic element is located between one corresponding third side plate and a sidewall of the third sliding plate structure.

6. The road simulation device according to claim 1, wherein the frame structure comprises a bottom plate and a fence; a lower end of the bottom plate is connected to the upper ends of the first baffle structure, the second baffle structure, the third baffle structure and the fourth baffle structure, and the fence is arranged at an upper end of the bottom plate.

7. The road simulation device according to claim 1, wherein the frame structure is provided with a seat structure, the seat structure is provided with a safety belt and for a tester to sit on, and sensors are arranged on the tester.

8. The road simulation device according to claim 1, wherein the first base structure, the second base structure, the third base structure and the fourth base structure have a same structure; the first base structure, the second base structure, the third base structure and the fourth base structure each comprise a support post and a base; an upper end of the support post is connected to one corresponding spherical hinge, a lower end of the support post is connected to the base, and a lower end of the base is connected to the road simulation vibration excitation equipment.

9. A test method using a road simulation device comprising a frame structure and a transmission structure, wherein the transmission structure comprises a first test bench, a second test bench, a third test bench, and a fourth test bench;
- the first test bench comprises a first baffle structure and a first base structure, the second test bench comprises a second baffle structure and a second base structure, the third test bench comprises a third baffle structure and a third base structure, and the fourth test bench comprises a fourth baffle structure and a fourth base structure;
- a first sliding plate structure is arranged in the first baffle structure, and slides in the first baffle structure in a first direction and a second direction; a second sliding plate structure is arranged in the second baffle structure, and slides in the second baffle structure in the first direction; a third sliding plate structure is arranged in the third baffle structure, and slides in the third baffle structure in the second direction;
- the first sliding plate structure and the first base structure are connected by a first spherical hinge, the second sliding plate structure and the second base structure are connected by a second spherical hinge, the third sliding plate structure and the third base structure are connected by a third spherical hinge, and the fourth baffle structure and the fourth base structure are connected by a fourth spherical hinge;
- upper ends of the first baffle structure, the second baffle structure, the third baffle structure and the fourth baffle structure are all connected to the frame structure, and lower ends of the first base structure, the second base structure, the third base structure and the fourth base structure are configured to be connected to road simulation vibration excitation equipment.
- the test method comprising following steps:
- step one: enabling a tester sitting on the frame structure, and arranging sensors on a body of the tester;
- step two: importing a road spectrum file into an upper computer, driving, by the upper computer, each road simulation vibration excitation equipment, and transferring road excitation to the road simulation device;
- step three: acquiring signals of the sensors; and
- step four: performing data processing and evaluation on the signals acquired by the sensors.

10. The test method according to claim 9, wherein the first baffle structure comprises a first bottom plate and four first side plates; the four fist side plates are connected in sequence, upper ends of the four first side plates are connected to the frame structure, the first bottom plate is located under the four first side plates, the first bottom plate is provided with a first through hole, and a size of the first through hole is less than that of the first sliding plate and greater than that of the first spherical hinge; a plurality of first elastic elements are respectively arranged between the first sliding plate structure and the four first side plates.

11. The test method according to claim 9, wherein the second baffle structure comprises a second bottom plate and four second side plates; the four second side plates are connected in sequence, upper ends of the four second side plates are connected to the frame structure, the second bottom plate is located under the four second side plates, the second bottom plate is provided with a second through hole, and a size of the second through hole is less than that of the second sliding plate and greater than that of the second spherical hinge; the second sliding plate structure is provided with first via holes through which first LM shafts penetrate, and two ends of the first LM shafts are respectively connected to two corresponding ones of the four second side plates.

12. The test method according to claim 11, wherein the third baffle structure comprises a third bottom plate and four third side plates; the four third side plates are connected in sequence, upper ends of the four third side plates are connected to the frame structure, the third bottom plate is located under the four third side plates, the third bottom plate is provided with a third through hole, and a size of the third through hole is less than that of the third sliding plate and greater than a size of the third spherical hinge; the third sliding plate structure is provided with second via holes through which second LM shafts penetrate, and two ends of the second LM shafts are respectively connected to two corresponding ones of the fourth third side plates.

13. The test method according to claim 12, wherein the first LM shafts are perpendicular to the second LM shafts; the first LM shafts each are sleeved with two second elastic elements, and each second elastic element is located between one corresponding second side plate and a sidewall of the second sliding plate structure; the second LM shafts each are sleeved with two third elastic elements, and each third elastic element is located between one corresponding third side plate and a sidewall of the third sliding plate structure.

14. The test method according to claim 9, wherein the frame structure comprises a bottom plate and a fence; a lower end of the bottom plate is connected to the upper ends of the first baffle structure, the second baffle structure, the third baffle structure and the fourth baffle structure, and the fence is arranged at an upper end of the bottom plate.

15. The test method according to claim 9, wherein the frame structure is provided with a seat structure, the seat structure is provided with a safety belt and for a tester to sit on, and sensors are arranged on the tester.

16. The test method according to claim 9, wherein the first base structure, the second base structure, the third base structure and the fourth base structure have a same structure; the first base structure, the second base structure, the third base structure and the fourth base structure each comprise a support post and a base; an upper end of the support post is connected to one corresponding spherical hinge, a lower end of the support post is connected to the base, and a lower end of the base is connected to the road simulation vibration excitation equipment.

* * * * *